United States Patent [19]

Pazmany

[11] 4,091,831
[45] May 30, 1978

[54] EMERGENCY SHUT-OFF VALVE

[76] Inventor: Ladislao Pazmany, San Diego, Calif.

[21] Appl. No.: 757,075

[22] Filed: Jan. 5, 1977

[51] Int. Cl.² ........................................... F16K 17/36
[52] U.S. Cl. ...................................................... 137/38
[58] Field of Search ................................... 137/38, 39

[56] References Cited

U.S. PATENT DOCUMENTS

| | | | |
|---|---|---|---|
| 1,742,685 | 1/1930 | Brandon | 137/38 |
| 2,215,044 | 9/1940 | Kammerdiner | 137/38 |
| 3,768,497 | 10/1973 | Mueller | 137/38 |

*Primary Examiner*—Robert G. Nilson

[57] ABSTRACT

A gas shut-off valve for utilization in private houses, public buildings, factories, or any other installation where gas is used and there is a probability of an earthquake. The valve is mounted on a solid base either part of the building or specifically provided for the valve. Inlet and outlet gas lines are connected to the valve body. Inside the valve body a ball is positioned on top of a circular support. The diameter of the support is proportional to the diameter of the ball and to a selected horizontal acceleration which is considered structurally damaging. When due to an earthquake the valve is accelerated horizontally beyond the selected value the ball will be unseated from its support and roll down an incline until it plugs the gas outlet hole. The ball can be repositioned on top of the support by a mechanism actuated from outside the valve.

4 Claims, 10 Drawing Figures

EMERGENCY SHUT-OFF VALVE

BACKGROUND OF THE INVENTION

The present invention relates to a gas shut-off valve which can be triggered by an earthquake.

There is a greater danger of explosion and fire due to broken gas lines as a result of an earthquake. The famous San Francisco earthquake of April 18, 1906 is often remembered as the great San Francisco fire. The earthquake damage in San Francisco has been estimated at $20,000,000 and the fire damage at $400,000,000. This illustrates the fire danger in earthquake areas. An automatic valve which cuts off the gas flow when activated by an earthquake could save lives and property.

The intensity of horizontal acceleration which is considered damaging for structures varies with geographical zones. The State of California specifies 0.133 of gravity. Other states have lower values. The valve should be able to react to any predetermined horizontal acceleration. Also, the horizontal accelerations produced by an earthquake may be in any direction, therefore, the valve should be equally sensitive in any direction.

After an earthquake or any other disturbance which triggered the valve, it may be desirable to reset the valve to the open position and re-establish the gas flow. This operation should be easily accomplished by unskilled persons.

The valve should not be easily triggered to the closed position, either by accident or intentionally. The repeated actuation of the re-setting mechanism should not disturb the valve once it is set in the armed position.

It is an object of the present invention to provide a simple, inexpensive valve, which will shut off the gas flow when it is triggered by an earthquake which reaches a certain magnitude in any horizontal direction.

Another object is to provide a simple mechanism for re-setting the valve to the armed position and re-establish the gas flow.

Another object is to provide a re-setting mechanism which will not disturb the valve once it is set in the armed position.

Another object is to provide a rugged valve made of durable materials which will not corrode or deteriorate over the years, so the valve will be effective to cut the passage of gas in case of an earthquake and the re-setting mechanism will be operational even after years of inactivity or after repeated operation.

Another object is to provide the minimum number of movable parts which are critical for the reliable accomplishment of the shut-off cycle, and this has been achieved by having only one moving part, a ball.

SUMMARY OF THE INVENTION

A preferred embodiment of the valve is characterized by a ball that rests on top of a narrow support with a diameter sized to provide a limited restrain against horizontal accelerations. For that reason the support makes contact with the ball only along the diameter of the support. This can be accomplished with either a thin wall tube or a rod with a concave top.

Once the ball is unseated from the support, it rolls down a ramp and plugs the gas outlet hole.

To reset the ball on top of the support, a handle or a knob is rotated in the appropriate direction. The handle is attached to a shaft which extends inside the valve body and is sealed against gas leaks. Two arms are attached to the shaft. These arms are symmetrically located on both sides of the ball when it rests on top of the outlet hole. These arms have concave inner faces which catch and lift the ball from the bottom of the valve body and swing it through a 180° arc to deposit it on top of an incline. The ball rolls down this incline until it is stopped by the centering sleeve.

Two levers, one at each side of the incline rotate on pivots which are attached to the valve body. One arm of each lever has a slot, the other arm is journaled to the centering sleeve. The slot in each lever slides over a circular cam which is excentric to the shaft. When the shaft is rotated, the cams which are attached to the shaft rotate the levers around the pivots and lower or raise the centering sleeve.

The centering sleeve slides inside of a circular hole in the valve body and it is concentric with the ball support when the sleeve is lowered. The ball, which was stopped in its down roll along the incline, continues to roll and drops through the sleeve on top of the support.

Another 180° rotation of the handle raises the sleeve leaving the ball free to fall out of the support when subjected to a lateral acceleration of intensity high enough to offset the equilibrium.

A circular chamber around the support has an inclined floor so the ball will roll toward the gas outlet hole regardless of the direction in which it fell from the support.

The gas inlet and outlet holes are located away from the ball when it is on top of the support to minimize gas flow disturbances. The valve body has provisions for solidly securing it to the base after leveling it. The top surface of the valve body can be used for leveling the valve since it is necessary to assure that the ball support is vertical. This is achieved by making the support axis perpendicular to the top surface of the valve body.

A cover is attached to the valve body and sealed hermetically. The cover can be removed for inspection and maintenance.

A locking pawl is provided to minimize inadvertent movement of the handle either by a person or by horizontal acceleration. This pawl can be lifted to free the handle for rotation.

The above and other aspects of the present invention will be apparent as the description continues and when read in conjunction with the appended drawings.

DETAILED DESCRIPTION OF THE DRAWINGS

Figure 1:
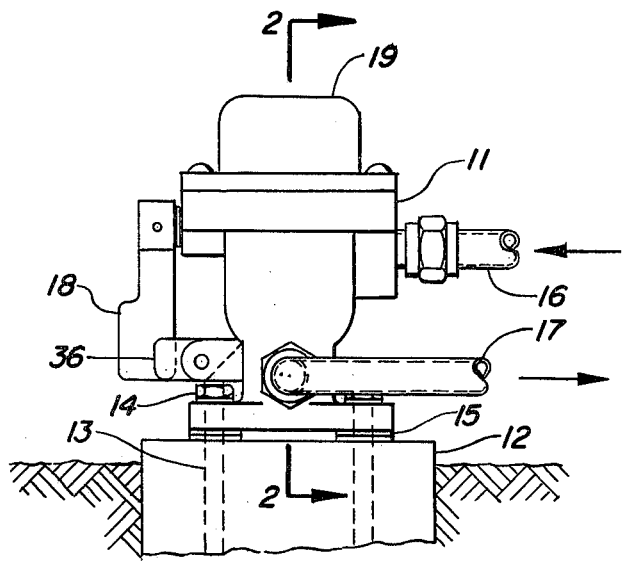
FIG. 1, is an end elevation view of the valve mounted on its base and connected to the inlet and outlet gas lines.

According to FIG. 1, the valve body 11 is shown mounted on a base 12, firmly secured by studs 13 and nuts 14. Spacers 15 between the valve body 11 and the base 12 are used for leveling. The gas inlets the valve body 11 through conduit 16 and exits through conduit 17. An external re-set handle 18 is shown in the "armed" position. A removable cover 19 seals the valve body 11.

Figure 2:
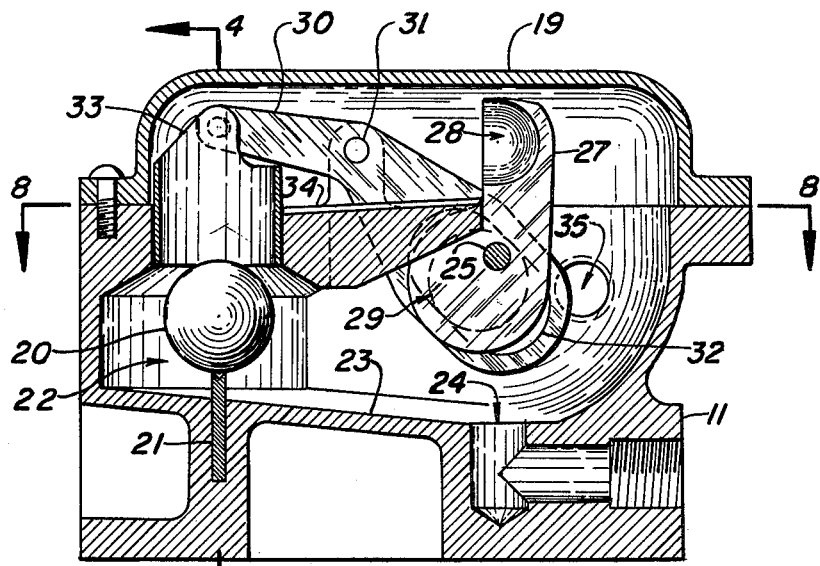
FIG. 2, is an enlarged side elevational cross section taken along line 2—2 in FIG. 1, showing the valve in the "armed" position.
Figure 3:
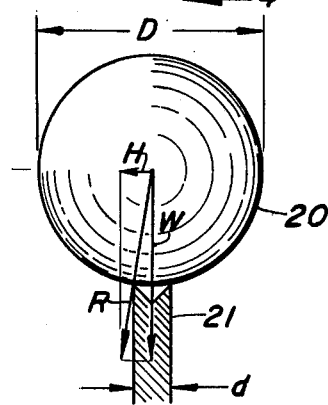
FIG. 3, is an enlarged detail view of the ball on top of the support.
Figure 4:
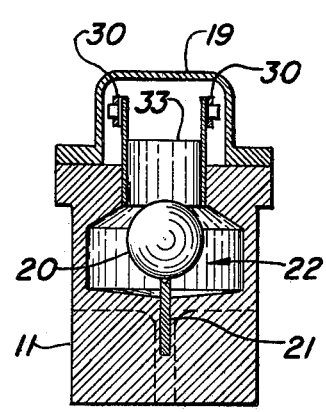
FIG. 4, is a reduced cross sectional view of the valve taken along line 4—4 in FIG. 2.

From FIG. 2, it is seen that the ball 20 is resting on top of support 21. FIG. 3 is a detail of support 21 showing the annular line of contact with the ball 20. The diameter "d" of the support 21 is a function of the diameter "D" of the ball 20 and the magnitude of the horizontal acceleration "H" which is required to activate the valve. ($d = (H/W) D$). For instance, if the valve of H is selected to be 0.13 of the acceleration of gravity "W", then the diameter "d" should be approximately 0.13 of "D". Any horizontal acceleration H smaller than 0.13 when combined with the acceleration of gravity "W", results in "R" which will pass inside of the annular line of contact, thus the ball will not move. An horizontal acceleration greater than 0.13 of gravity will produce a resultant force "R" which passes outside of the annular support causing the ball to topple from its seat.

Figure 5:
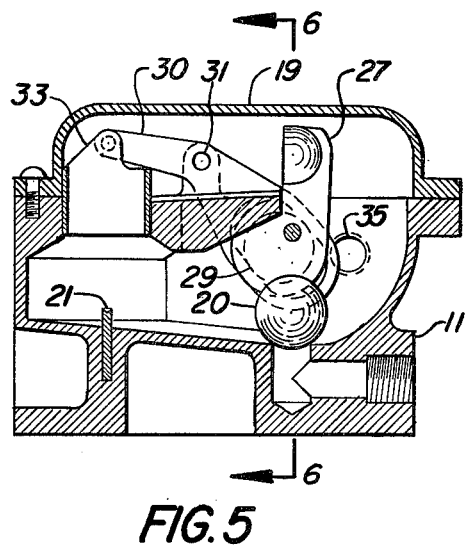
FIG. 5, is a reduced side elevational cross section similar to FIG. 2, but with the ball seated on top of the gas outlet hole.

Again referring to FIG. 2, the ball 20 falls from the support 21 into a chamber 22 which has an inclined floor. Regardless in which direction the ball falls, it will roll toward and down ramp 23 until it rests on top of the gas outlet as shown in FIG. 5 and FIG. 6.

Figure 6:
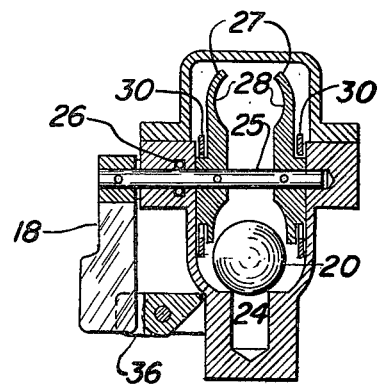
FIG. 6, is a cross sectional view of the valve taken along line 6—6 in FIG. 5.
Figure 7:
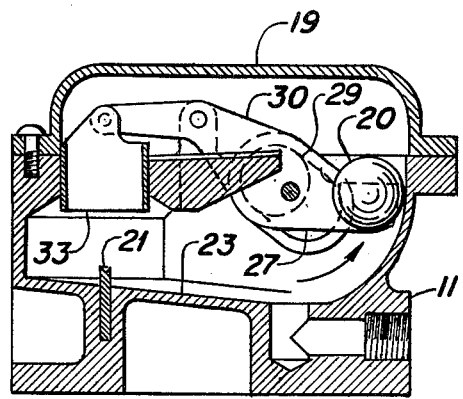
FIG. 7, is a side elevational cross section similar to FIG. 5, but with the handle rotated ¾ turn counterclockwise with respect to position shown in FIG. 5, and with the arms lifting the ball.
Figure 8:
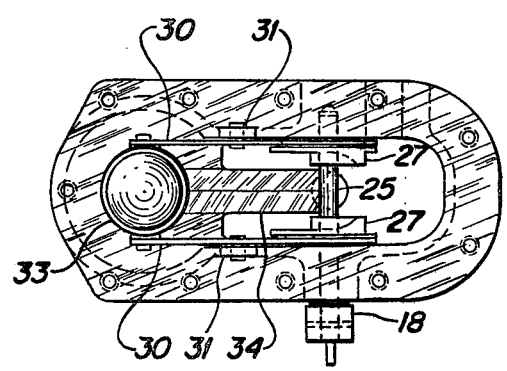
FIG. 8, is a reduced top view of the valve taken along line 8—8 in FIG. 2.

The ball 20 reset mechanism is better shown in FIG. 2 and FIG. 6. This mechanism is activated by the external handle 18, which is attached to shaft 25. A seal 26 around shaft 25 avoids gas leakage. Two arms 27 are also attached to shaft 25 and have integral cavities 28. A circular cam 29 is also integral of each arm 27. Two levers 30 are pivoted on supports 31 and have slots 32 which engage with cams 29. The other arm of each lever 30 is journaled to centering sleeve 33. When the handle 18 is rotated in the direction indicated by arrows in FIG. 7 and FIG. 9, the ball is caught by the cavities 28 in arms 27 as shown in FIG. 7. Another half turn of the handle in the same direction will lift the ball on top of incline 34 as shown in FIG. 9.

Figure 9:
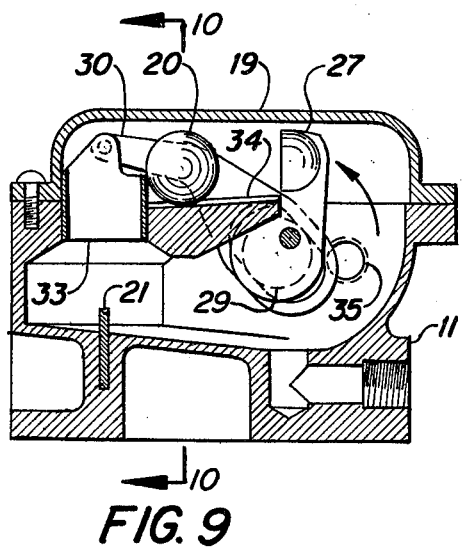
FIG. 9, is a side elevational cross section similar to FIG. 5, but with the ball rolled against the centering sleeve.
Figure 10:
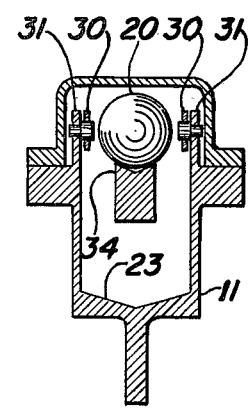
FIG. 10, is a cross sectional view of the valve taken along line 10—10 in FIG. 9, with the centering sleeve omitted for clarity.

The ball 20 will roll out from the cavities 28 and down the incline 34 until it is stopped by the centering sleeve 33 as shown in FIG. 9. Another half turn of the handle 18 lowers the centering sleeve 33 to the point where the top edge is level with the incline 34. At this time, the ball 20 continues rolling into the hole of centering sleeve 33 and falls down on top of support 21. Since the centering sleeve 33 is at its lowest position and surrounding the ball 20, any bouncing will be limited to a vertical direction. Therefore the ball, after a few bounces, settles on top of support 21. Another half turn of the handle 18 lifts the centering sleeve 33 and leaves the valve in the "armed" position.

It is obvious that while the ball 20 is on top of the support 21, further rotation of handle 18 can not disturb the ball. The centering sleeve 33 only slides up and down without touching the ball. As long as the valve which is made very rigid is solidly attached to the base 12, the only disturbance which can topple the ball is an horizontal acceleration of sufficient magnitude.

In FIG. 2, it is seen that the ball 20 is away from the gas inlet hole 35 and the gas outlet hole 24, and will not be disturbed from its marginal equilibrium on top of support 21 by the gas flow through the valve body.

The re-set handle 18 can be locked in the down position by a pawl 36 to avoid inadvertent rotation of the handle.

Many changes may be made in details of this invention, in the methods and materials of fabrication, in the configuration and assemblage of the constituent elements, without departing from the spirit and scope of the appended claims, which changes are intended to be embraced therewithin.

What I claim and desire to secure by the United States Letters Patent is:

1. An emergency shut-off valve comprising:
    a valve body having a fluid tight chamber, said valve body having a fluid inlet hole and a fluid outlet hole both of which are in communication with said fluid tight chamber,
    means within said chamber for detecting a selected horizontal acceleration and for closing said fluid outlet hole when the horizontal acceleration is equal to or greater than the selected value due to an earthquake tremor, said means comprising a vertical support located within said valve body and a ball that is normally resting on the top of said vertical support,
    means for resetting the ball back on top of the vertical support when it has fallen off the support and has traveled to a position where it plugs the fluid outlet hole, said means comprising an external handle connected to a shaft that passes through the valve body along with a pair of laterally spaced lifting arms that are mounted on the shaft, when the handle is turned the arms operate to lift the ball from plugging engagement with the fluid outlet hole, an incline is located adjacent the shaft so that it is positioned to receive the ball as it is lifted and removed from the fluid outlet hole, a centering sleeve is located adjacent the lower end of the incline so that when the ball is deposited at the top of said incline, it will roll downwardly to its lower end and drop into the centering sleeve that is supported above the vertical support.

2. An emergency shut-off valve as recited in claim 1 wherein the upper end of the vertical support has means for providing a circular line of contact with said ball.

3. An emergency shut-off valve as recited in claim 1 wherein the fluid outlet hole is at the lowest point of the chamber and the floor of the chamber surrounding said vertical support is inclined downwardly toward said fluid outlet hole to make the fallen ball roll down the inclined surface and plug the outlet hole.

4. An emergency shut-off valve as recited in claim 1 wherein said means for resetting the ball back on top of the vertical support further comprises a pair of levers pivotally mounted intermediate their ends to the valve housing, one end of each lever is pivotally attached to the top of said centering sleeve and the other ends have slots in which cams formed integrally on said lifting arms travel as said external handle is cranked to raise and lower said centering sleeve.

* * * * *